United States Patent [19]

Gray

[11] Patent Number: 5,358,300
[45] Date of Patent: Oct. 25, 1994

[54] MODULAR ASSEMBLY FOR VEHICLE BODY

[75] Inventor: John D. Gray, Union, N.H.

[73] Assignee: Davidson Textron Inc., Dover, N.H.

[21] Appl. No.: 140,881

[22] Filed: Oct. 25, 1993

[51] Int. Cl.$^5$ ............................................. B62D 25/14
[52] U.S. Cl. .................................... 296/192; 296/194; 296/208; 296/70; 296/72
[58] Field of Search ................... 296/70, 72, 192, 194, 296/208; 180/90; 454/143, 145–148

[56] References Cited

U.S. PATENT DOCUMENTS

| | | | |
|---|---|---|---|
| 3,640,457 | 2/1972 | Colinet et al. | 454/148 X |
| 4,391,465 | 7/1983 | Piano | 296/208 |
| 4,582,156 | 4/1986 | Kochy et al. | 296/72 X |
| 4,597,461 | 7/1986 | Kochy et al. | 296/72 X |
| 4,733,739 | 3/1988 | Lorenz et al. | 180/90 |
| 5,005,898 | 4/1991 | Benedetto et al. | 296/194 |
| 5,082,078 | 1/1992 | Umeda et al. | 180/90 |
| 5,088,571 | 2/1992 | Burry et al. | 180/90 |

FOREIGN PATENT DOCUMENTS 0456531  11/1991  European Pat. Off. ............. 296/70

*Primary Examiner*—Dennis H. Pedder
*Attorney, Agent, or Firm*—Reising, Ethington, Barnard, Perry & Milton

[57] ABSTRACT

A modular assembly for separating a passenger compartment from an engine compartment in an automotive vehicle body comprises three structural cross car members that combine to provide sufficient cross car stiffness between the side pillars so as to eliminate any need for an upper cross car beam at the cowl of the vehicle body. The three structural cross car members include a front of dash panel, an intermediate close out panel and an instrument panel carrier that form two rows of ducts for meeting the needs of the heating, ventilating and air conditioning system of the vehicle and the wiring requirements of the instrument panel. The instrument panel carrier is part of a covered instrument panel subassembly that includes a shell and an underlying foam cushion. The foam cushion is foamed in place in a mold that includes a slide and pivot mechanism for manipulating a mold lid and clamp between a closed clamped position and a shaping position where the molded subassembly is accessible for a shaping operation.

18 Claims, 3 Drawing Sheets

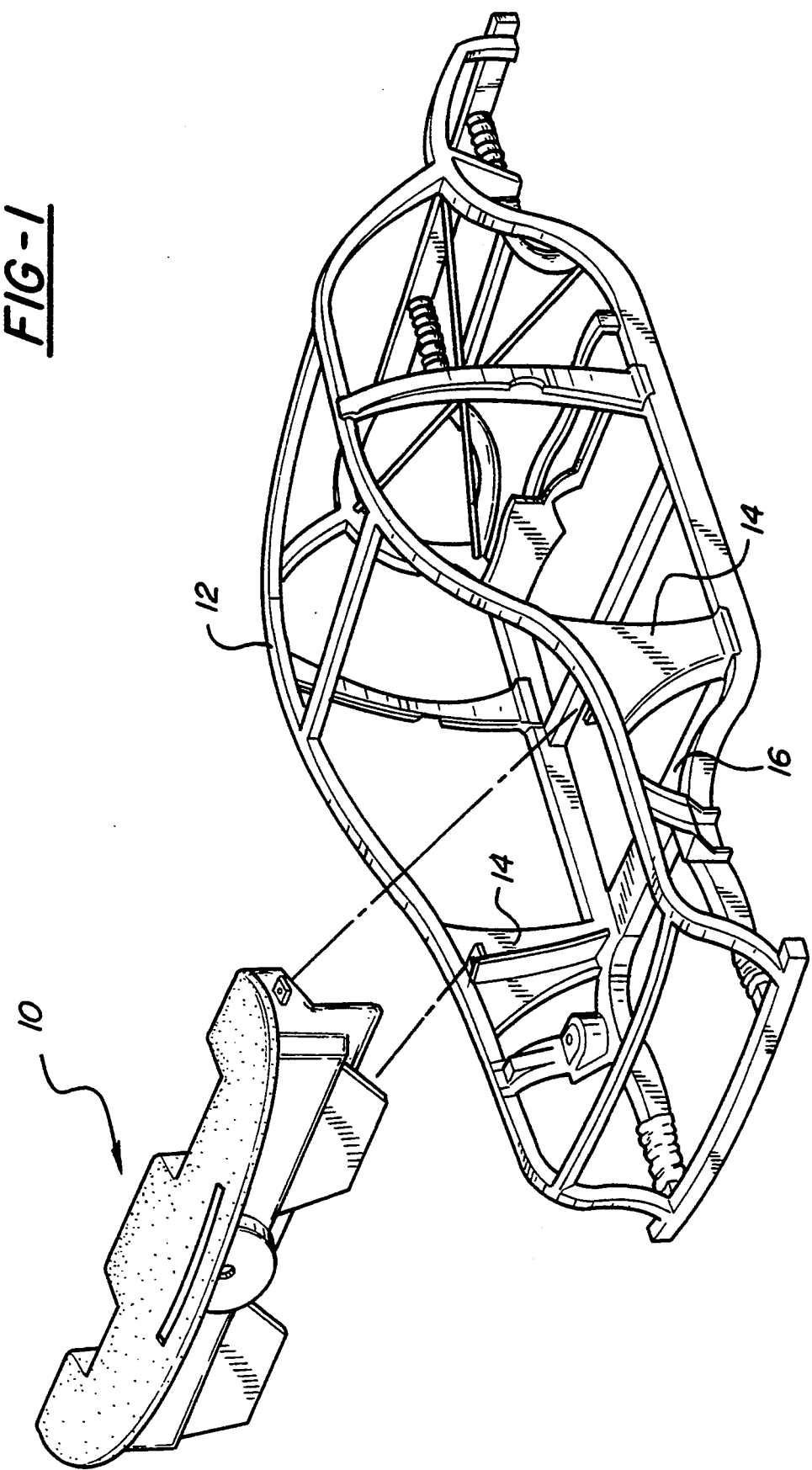

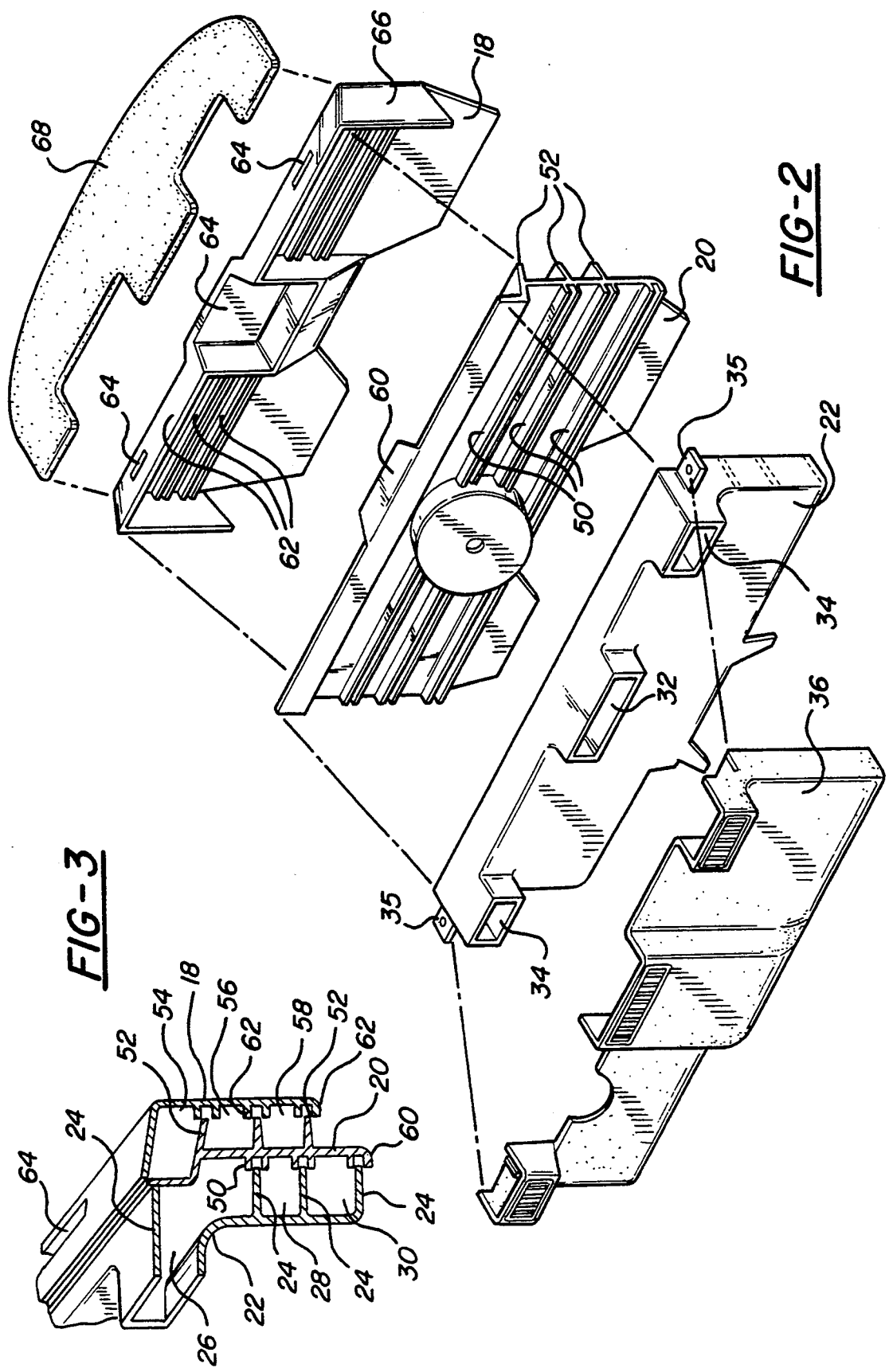

MODULAR ASSEMBLY FOR VEHICLE BODY

BACKGROUND OF THE INVENTION

This invention relates generally to automotive vehicle bodies and more particularly a modular assembly for separating a passenger compartment from an engine compartment in an automotive vehicle body.

U.S. Pat. No. 4,391,465 granted to Renzo Piano Jul. 5, 1983 discloses an assembly separating a passenger compartment from an engine compartment comprising a first element (commonly referred to as a front of dash or "FOD" panel) of high mechanical and flame resistance material and a second element (commonly referred to as an instrument panel or dashboard) of lower hardness and mechanical resistance material. The FOD panel has an upper portion that supports the instrument panel and integral housings for accommodating members and devices of a heating and ventilation system. The FOD panel also generates with the instrument panel cavities and channels for the heating and ventilation system that are not disclosed in detail. However, it is clear that the Piano assembly provides only one row of channels which may not be adequate to meet the comfort needs of today's vehicle passengers. Moreover, the Piano assembly requires use of a separate cross car beam at the cowl that must be threaded through the assembly some fashion thus possibly further limiting the number of channels that are available for meeting the comfort needs of the vehicle passengers.

U.S. Pat. No. 5,005,898 granted to Piero Benedetto, Salvatore Bezzi and Paola Odone Apr. 9, 1991 discloses a vehicle structure comprising a FOD panel for closing an opening between a passenger compartment and an engine compartment and an instrument panel that is mounted directly against the face of a rigid element of the FOD panel. The FOD panel includes an upper portion formed substantially as a cross member and provided with integral brackets for connection to the vehicle body. The Benedetto structure also includes an air conditioning unit however the patent drawings and specification do not show or disclose any detail of the heating and ventilating ducts.

U.S. Pat. No. 5,082,078 granted to Takashi Umeda et al Jan. 21, 1992 discloses a motor vehicle structure comprising a cowl unit that is inserted into the top of an engine compartment and an instrument panel unit that is inserted into a passenger compartment from a door opening. The instrument panel unit comprises an instrument panel, a steering system, an air conditioning unit, a tube member (cross car beam) and brackets. The brackets attach the tube member to the side pillars as shown in FIGS. 5 and 6. The instrument panel is not shown in detail. However, FIG. 2 shows wiring harness behind the instrument panel and FIG. 5 shows that the instrument panel includes a side demister tube.

U.S. Pat. No. 5,088,571 granted to Donald L. Burry and Leonard J. Pilato Feb. 18, 1992 discloses a standardized or generic modular structural instrument panel carrier and a uniquely designed conventional molded plastic instrument panel cover. The structural instrument panel carrier comprises two panels of fiber reinforced plastic material that are attached together to form a box beam that is an integral load bearing structure of the vehicle body and that also provides a single air transfer duct across the vehicle. The box beam is not integrated with a FOD panel but it does appear to be attached to a reinforcement panel that is part of the bulkhead structure after assembly into the vehicle. In any event, the box beam does not form any ducts in cooperation with the reinforcement panel or the bulkhead structure.

U.S. patent application Ser. No. 08/078,140 filed Jun. 15, 1993 assigned to the assignee of this invention discloses a motor vehicle body that has an instrument panel construction that includes a structural instrument panel carrier of plastic material for mounting instrument panel components. The carrier is attached to side pillars located at a juncture of passenger and engine compartments so as to form a cross beam. The instrument panel construction has its external appearance determined by adding facial instrument panel coverings to the instrument panel carrier after the instrument panel components are mounted on the instrument panel carrier. The structural instrument panel carrier may also be integrated with a front of dash (FOD) panel that may be composed of the same material and that provides a second cross beam.

U.S. patent application Ser. No. 08/078,348 pending filed Jun. 21, 1993 and assigned to the assignee of this invention discloses an automotive vehicle body that has an integrated cross car structural duct cluster that is a composite that is connected to side pillars located on opposite sides of the vehicle body. The composite acts as a cross beam and provides four ducts that extend across the width of the vehicle body. Three ducts are related to the HVAC system of the vehicle and the fourth is a wiring duct. Five variations are disclosed. In two the composite comprises steel rods embedded in a molded plastic body. In the other three the composite comprises a steel plate that is attached to a molded plastic body.

U.S. patent application Ser. No. 08/078,140 pending filed Jun. 15, 1993 and U.S. patent application Ser. No. 08/078,348 filed Jun. 21, 1993 are hereby incorporated in their entirety in this patent specification by reference.

SUMMARY OF THE INVENTION

The object of this invention is to provide a modular assembly that can be assembled off line and installed in a vehicle body as an integral load bearing structure of the vehicle body and that includes a front of dash or FOD panel, an instrument panel and a plentiful number of channels for meeting the needs of a modern heating, ventilating and air conditioning system, and wiring requirements for the instrument panel.

A feature of this aspect of the invention is that the modular assembly of the invention comprises three cross car structural members that are combined so as to eliminate any need for another cross car beam at the cowl of the vehicle body structure.

Another feature of this aspect of the invention is that the modular assembly of the invention comprises three cross car structural members that are combined so as to form two rows of channels or ducts and thus provide a plentiful number of channels for meeting the needs of a modern heating, ventilating and air conditioning system.

Still another feature of this aspect of the invention is that the modular assembly provides a structural member for energy management for knee bolsters and airbags.

Another object of this invention is to provide a padded or cushioned and covered instrument panel subassembly for the modular assembly described above and a mold useful in making the subassembly.

A feature of this aspect of the invention is that the modular assembly includes a cross car structural member that has a partially formed row of channels and that is used as a structural instrument panel carrier in a covered instrument panel subassembly that has an underlying elastomeric cushion that is foamed in place using the cross car structural member as a mold insert.

Another feature of this aspect of the invention is a mold for making the instrument panel subassembly that has a pivot and slide mechanism for moving the molded instrument panel subassembly out of the mold cavity to a machining position where the molded instrument panel subassembly is accessible for milling and drilling or other shaping operations.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is an exploded perspective view showing the relationship of the modular assembly of the invention to a typical automotive vehicle body;

FIG. 2 is an exploded perspective view of the modular assembly shown in FIG. 1;

FIG. 3 is a sectioned perspective view of the modular assembly shown in FIG. 2;

DESCRIPTION OF THE INVENTION

Figure 4:
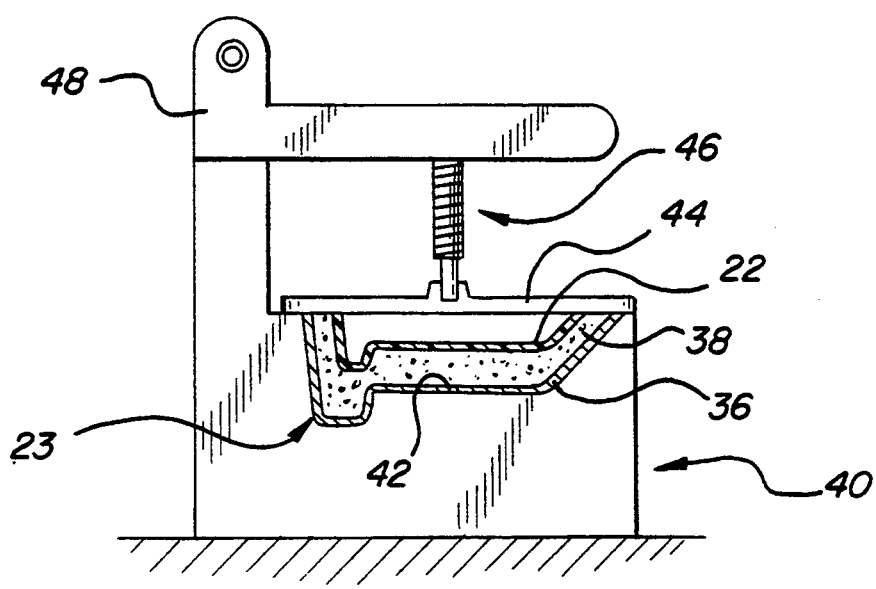
FIG. 4 is sectional view of the instrument panel of the modular assembly FIGS. 1, 2 and 3 in the process of being manufactured.

Referring now to the drawing, FIG. 1 shows a modular assembly 10 of the invention in relation to an automotive vehicle body 12 comprising a frame that includes two side pillars 14 at the juncture of the engine and passenger compartments of the vehicle body. The side pillars 14 typically support opposite ends of a FOD panel that separates the engine and passenger compartments and also typically support the respective front vehicle doors (not shown) on hinges. The frame of the vehicle body further includes a cross car beam 16 that is attached to the lower ends of the side pillars 14.

The modular assembly 10 is assembled off-line and then installed in the vehicle body 12 by dropping the modular assembly 10 through the contiguous openings at the top of the engine compartment and for the windshield as shown in FIG. 1. The advantage of off-line assembly is that all sides of the modular assembly 10 are more accessible and the modular assembly 10 can be turned or tilted to provide ready access to any side or portion during the off-line build up. The modular assembly 10 makes good use of this advantage by including as many functions as possible particularly with regard to the air channels or ducts for the heating, ventilating and air conditioning (HVAC) system.

Referring now to FIG. 2, the modular assembly 10 comprises three structural cross car members that combine to provide sufficient cross car stiffness between the side pillars 14 so as to eliminate any need for an upper cross car beam at the cowl of the vehicle body which is the area between the top of the engine compartment and the bottom of the windshield. These three structural cross car members are a front of dash (FOD) panel 18, a close out panel 20, and an instrument panel carrier or facial retainer 22. The members are preferably made of a moldable structural plastic material such as urethane that is filled with fiberglass for reinforcement. Other examples of suitable plastic materials include epoxy, polyester engineering thermoplastics, and compression molding thermosets and thermoplastics. Fillers such as carbon fiber, Kevlar, wollastonik or ceramic fibers may also be used if a reinforcement filler is needed or desired.

The instrument panel carrier 22 is part of a instrument panel subassembly 23 as explained below in connection with FIGS. 4 and 5. This instrument panel carrier 22 is formed with several longitudinal ribs 24 that are vertically spaced and project from one side of the carrier for partially forming a vertical row of longitudinal ducts behind the face of the instrument panel subassembly 23. As depicted in FIGS. 2 and 3, the instrument panel carrier 22 has four longitudinal ribs 24 that partially create three longitudinal ducts 26, 28 and 30. Duct 26 is a main heating, ventilating and air conditioning (HVAC) duct for the passenger compartment that extends from one side of the vehicle to the other and includes a central outlet 32 and two side outlets 34. Ducts 28 and 30 may be used for the heating, ventilating and air conditioning (HVAC) system or for wiring and these ducts may or may not extend continuously from one side to the other depending upon their use. The instrument panel carrier 22 also has end portions 35 for securing the instrument panel carrier 22 to the side pillars 14.

Figure 5:
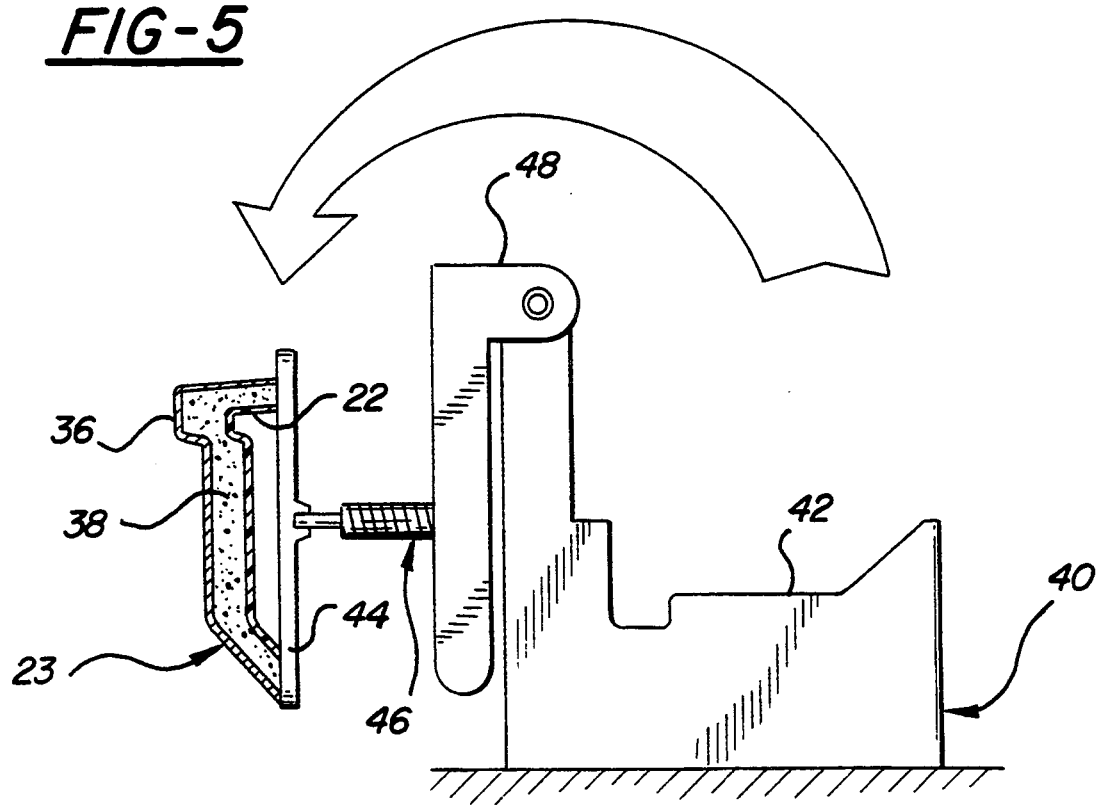
FIG. 5 is a sectional view similar to FIG. 4 showing the instrument panel member of FIG. 4 at a later stage of manufacture.

Digressing now to the instrument panel subassembly 23 itself, the instrument panel subassembly 23 comprises a shell or skin 36, an underlying foam cushion 38 and the instrument panel carrier 22 as best shown in FIGS. 4 and 5. The instrument panel carrier 22 is preferably a standardized or generic design for a number of automobiles while the shell or skin 36 may be uniquely designed from an aesthetic standpoint for specific models or lines of a particular brand of automobile.

The instrument panel subassembly 23 is made in a mold 40 that has a cavity 42 that provides or matches the face of the instrument panel assembly 23. The mold 40 further comprises a lid 44, a clamp 46 for holding the lid 44 closed and a slide and pivot mechanism 48 for manipulating the lid 44 and the clamp 46 back and forth between the closed clamped and machining positions shown in FIGS. 4 and 5 respectively.

The shell 36, which is made of a castable thermoplastic material such as polyvinyl chloride, is either cast separately and then placed in the mold bowl 42 or the shell 36 can be sprayed or cast directly in the mold bowl 42. In either event, the instrument panel carrier 22 is then attached to the lid 44 which is then moved to the closed and clamped position shown in FIG. 4.

The foam cushion 38 is then foamed in place between the shell 36 and the instrument panel carrier 22 using a foam precursor material that generates an elastomeric foam such as elastomeric polyurethane. The instrument panel subassembly 23 is removed from the mold bowl 42 after the foam cushion 38 cures and placed in the machining position shown in FIG. 5 by the slide and pivot mechanism 48. In this position the lid 44 is pivoted approximately 270° so that the entire shell 36 is accessible. The instrument panel subassembly 23 can then be milled and drilled or shaped in any other fashion by machining operations. The clamp 46 may also house a punch and die trimming operation to trim the instrument panel subassembly 23 before it is removed from the mold bowl 42.

Returning now to FIGS. 2 and 3, the close out panel 20 is then attached to the instrument panel carrier 22 to close a first vertical row of horizontal ducts 26, 28 and 30. The close out panel 20 has rearward facing conformations 50 that engage the ribs 24 for this purpose. The close out panel 20 also has forward facing ribs 52 that partially form a second vertical row of horizontal ducts 54, 56 and 58 behind the first row. The close out panel 20 further includes a central portion 60 that partially forms a housing for an HVAC unit (not shown).

The FOD panel 18 is then attached to the close out panel 20 to close the second row of horizontal ducts 54, 56 and 58 and complete the housing for the HVAC unit. The FOD panel 18 has rearward facing conformations 62 that engage the close out beam 20 and the ribs 52 to complete the second row of ducts and a central portion 64 that cooperates with the central portion of the close out beam 20 to form the housing for the HVAC unit.

The top duct 54 in the second row can conveniently provide a strategically located defroster duct and the forward facing conformation 62 at the top of the FOD panel 18 may be provided with outlets 64 for this purpose. The ducts 56 and 58 can also be used for the HVAC system or as wiring ducts. The FOD panel 18 also has end portions 66 for attaching the FOD panel 18 to the side pillars 14.

The modular assembly 10 may also include a decorative top pad 68 or the decorative top pad 68 can be installed after the modular assembly 10 is installed in the vehicle.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A modular assembly for separating a passenger compartment from an engine compartment between side pillars in an automotive vehicle body comprising:
   three structural cross car members that combine to provide an upper cross car beam with sufficient cross car stiffness when attached between the side pillars of an automotive vehicle body so as to eliminate any need for another upper cross car beam at the cowl of the vehicle body,
   the three structural cross car members including a front of dash panel, an intermediate panel and an instrument panel carrier that form two vertical rows of horizontal ducts on opposite sides of the intermediate panel.

2. The modular assembly as defined in claim 1 further including an instrument panel subassembly wherein the instrument panel carrier is part of the instrument panel subassembly.

3. The modular assembly as defined in claim 1 wherein the instrument panel carrier is formed with several longitudinal ribs that project from one side for partially forming one of the two vertical rows of horizontal ducts.

4. The modular assembly as defined in claim 3 wherein one of the horizontal ducts in the one row is a main heating, ventilating and air conditioning (HVAC) duct for a passenger compartment that extends from one side of the vehicle to the other and includes a central outlet and two side outlets.

5. The modular assembly as defined in claim 1 wherein the instrument panel carrier has end portions for securing the instrument panel carrier to the side pillars of an automotive vehicle body.

6. The modular assembly as defined in claim 2 wherein the instrument panel subassembly comprises a shell, an underlying foam cushion and the instrument panel carrier; the foam cushion being foamed in place between the shell and the instrument panel carrier in a mold.

7. A modular assembly for separating a passenger compartment from an engine compartment between side pillars in an automotive vehicle body comprising:
   three structural cross car members that combine to provide an upper cross car beam with sufficient cross car stiffness when attached between the side pillars of an automotive vehicle body so as to eliminate any need for another cross car beam at the cowl of the vehicle body,
   the three structural cross car members including a front of dash panel, an intermediate panel and an instrument panel carrier that form two vertical rows of horizontal ducts,
   the instrument panel carrier having several longitudinal ribs that project from one side for partially forming one of the two vertical rows of horizontal ducts, and
   the intermediate panel being a close out panel that is attached to the instrument panel carrier for closing the ducts in the one row and that has rearward facing conformations that engage the ribs of the instrument panel carrier for this purpose.

8. The modular assembly as defined in claim 7 wherein the close out panel has forward facing ribs that partially form ducts in another row of the two rows of horizontal ducts.

9. The modular assembly as defined in claim 8 wherein the close out panel has a central portion that partially forms a housing for an HVAC unit.

10. The modular assembly as defined in claim 9 wherein the front of dash panel is attached to the close out panel to close out the other row of horizontal ducts and complete the housing for the HVAC unit.

11. A modular assembly for separating a passenger compartment from an engine compartment between side pillars in an automotive vehicle body comprising:
   three structural cross car members that combine to provide an upper cross car beam with sufficient cross car stiffness when attached between the side pillars of an automotive vehicle body so as to eliminate any need for another cross car beam at the cowl of the vehicle body,
   the three structural cross car members including a front of dash panel, an intermediate panel and an instrument panel carrier that form two vertical rows of horizontal ducts,
   the front of dash panel having rearward facing conformations that engage the intermediate panel to cooperatively form one row of the two rows of horizontal ducts.

12. The modular assembly as defined in claim 11 wherein the front of dash panel has end portions for attaching the front of dash panel to the side pillars.

13. A modular assembly for separating a passenger compartment from an engine compartment between side pillars in an automotive vehicle body comprising:

three structural cross car members that are combined to provide an upper cross car beam with sufficient cross car stiffness between the side pillars so as to eliminate any need for another upper cross car beam at the cowl of the vehicle body, the three structural cross car members including a front of dash panel, an intermediate panel and an instrument panel carrier that form two rows of horizontal ducts, the intermediate panel being a close out panel that partially forms each of the horizontal ducts in each row.

14. The modular assembly as defined in claim 13 wherein the close out panel is attached to the instrument panel carrier for closing the horizontal ducts in one row and attached to the front of dash panel for closing the horizontal ducts in another row.

15. The modular assembly as defined in claim 14 wherein the close out panel has rearward facing conformations engaging the instrument panel carrier for closing the horizontal ducts in the one row and forward facing conformations engaging the front of dash panel for closing the horizontal ducts in the other row.

16. The modular assembly as defined in claim 15 wherein the close out panel and the front of dash panel have cooperating portions forming a housing for an HVAC unit.

17. The modular assembly as defined in claim 13 wherein the instrument panel carrier has end portions for securing the instrument panel carrier to the side pillars of an automotive vehicle body and the front of dash panel has end portions for attaching the front of dash panel to the side pillars.

18. A modular assembly for separating a passenger compartment from an engine compartment in an automotive vehicle body comprising:

an instrument panel subassembly that includes a shell, an underlying foam cushion and an instrument panel carrier, the modular assembly further comprising a front of dash panel and a close out panel, the instrument panel carrier, the front of dash panel and the close out panel being attached to each other to form two sets of horizontal ducts on opposite sides of the close out panel, and the instrument panel carrier, the front of dash panel and the close out panel being combined to provide an upper cross car beam with sufficient cross car stiffness when attached to the side pillars of a vehicle body so as to eliminate any need for another upper cross car beam at the cowl of the vehicle body.

* * * * *